Patented Apr. 11, 1944

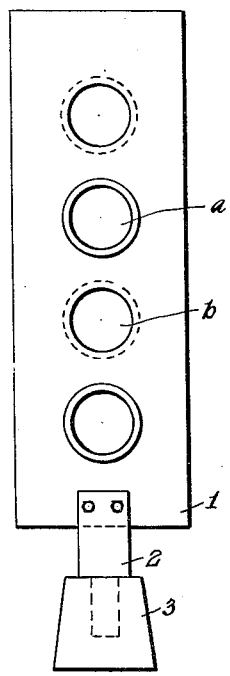
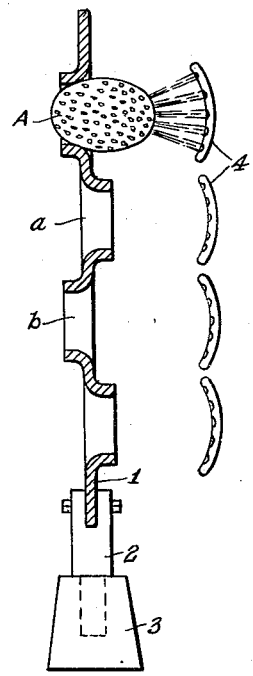
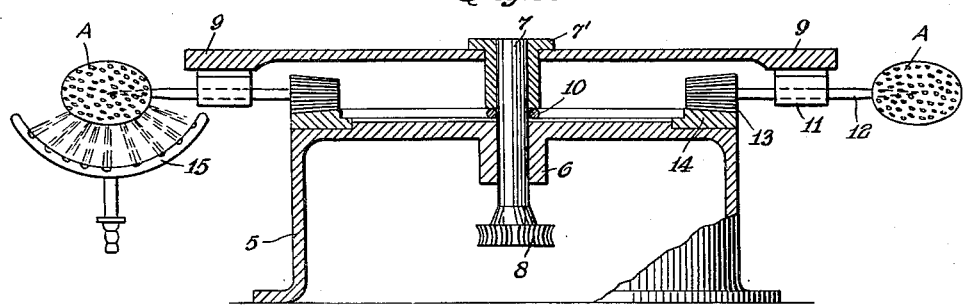

2,346,201

UNITED STATES PATENT OFFICE 2,346,201

METHOD OF PREPARING ARTIFICIAL SPONGES

Léon Pierre Georges Vautier, Saint Just des Marais, France; vested in the Alien Property Custodian Application December 30, 1939, Serial No. 311,910
In France February 9, 1939

3 Claims. (Cl. 18—48)

This invention relates to the manufacture of artificial sponges. More particularly, this invention relates to a method of producing artificial sponges having a highly porous or open surface.

In the manufacture of artificial sponges, a pasty or plastic mass comprising a thick solution of a cellulose derivative, fibrous material and pore-forming substance, such as fusible or soluble crystalline substances, is appropriately molded or coagulated. Subsequently, the pore-forming substances are eliminated from the mass by fusion or dissolution thereof, depending on the nature of said pore-forming substance. The elimination of the pore-forming substance from the coagulated mass results in the production of pores of greater or smaller size. It has been observed that porous blocks obtained by the procedure immediately before described and, for example, from a plastic or pasty mixture of viscose, hemp and sodium sulphate, are characterized by a crust which is more or less thick and not very porous. In the case of large blocks capable of producing several artificial sponges when cut into sections, this outer crust is removed by sawing or planing, and the portions (crust) removed by said sawing or planing are generally considered as waste. The amount of this waste, although relatively small in this case, is by no means negligible.

It has previously been proposed to mold the sponge-forming composition continuously by means of appropriate presses and to coagulate the large bar that is formed by slowly passing said bar through a tubular member, which is cold at the inlet and the succeeding portions of which are progressively hotter and hotter. The sliding of the bar over the wall of the tube causes the surface of the bar to assume a certain roughness, whereby the surface of the bar is rendered less crusty or more open than in the case of discontinuous molding.

Another method of manufacturing artificial sponge blocks with a more porous surface contemplates molding the sponge-forming composition in vessels in which the walls thereof are provided with substances susceptible to producing gas bubbles upon reaction with one or more components of the sponge-forming composition.

Round artificial sponges in the shape of balls, which more or less imitate the natural sponges, are generally manufactured by individual molding, and in this case it is, of course, necessary to reduce as much as possible the waste which here plays a much more important role than where sponges are manufactured by the cutting up of large blocks. It is clear that it is practically prohibitive to make round sponges by cutting up artificial parallelepipedonal sponges because of the waste consisting of the cuttings that cannot be used.

United States Patents Nos. 2,043,564 and 2,107,637 disclose processes of manufacturing round artificial sponges having a porous surface by incrusting during the molding operation soluble crystalline materials or any kind of polyhedral bodies, respectively, which are eliminated after coagulation.

An object of this invention is to produce artificial sponges characterized by highly porous surfaces.

Another object of the invention is to produce round (spherical, ovoidal, etc.) artificial sponges characterized by highly porous surfaces.

A further object of the invention is to provide a method of producing artificial sponges having highly porous surfaces.

Additional objects will become apparent from the following description and appended claims.

The instant invention is particularly adapted for the production of round (i. e., spherical, ovoidal, etc.) artificial sponges. According to the instant invention, a sponge-forming viscous composition is molded to produce, for example, a spherical or other round shaped mass in the manner and by the process described in French Patent No. 812,502 of October 24, 1936. The molded mass is then coagulated in any of the usual manners. If desired, prior to coagulation, the molded mass is provided with a casing or covering whereby the sponge is protected during the coagulation process. The thus-obtained coagulated, molded mass is subjected to an operation, more particularly described hereinafter, to open up the crust thereon and produce a highly porous surface. Thereafter the sponges may be subjected to the usual finishing treatments.

The operation for producing the highly porous surface is accomplished, in accordance with the instant invention, by chemically or mechanically treating in situ the crust surface of the coagulated molded mass. The treatments are preferably performed in a manner which removes or opens up the surface (crust) without attacking the interior thereof.

In that embodiment whereby the crust surface is removed or opened up by a chemical treatment, the crust surface is treated with substances which destroy the crust surface or open up the same to produce a highly porous surface. As an illustrative example of chemicals which have produced satisfactory results may be mentioned oxidizing agents. In one form of this phase of the invention, powdered oxidizing agents are sprinkled on the surface in an amount sufficient to remove the crust on said surface without attacking the interior of the sponge. It is to be understood that in this procedure, the sponges may be in the moist or dry state.

Various mechanical treatments to produce a highly porous surface may be utilized. The coagulated molded mass may be subjected to a mechanical treatment whereby the crust surface is removed and/or opened up to provide a highly porous surface. In one form of this embodiment, a coagulated molded material may be subjected to a carding operation. Though the carding operation can be performed by hand, in the preferred form it is effected by appropriate apparatus. With this in view, the coagulated molded masses are introduced into a revolving drum, the interior of which is provided with a lining of cards, needles, small hooks, etc. Means are also provided, if desired, to direct the articles against the walls so that they may be operated on by the carding members. Likewise, means are also provided to facilitate the removal of the sponges which become attached to the carding elements. The drums may revolve about their axes of symmetry or about any other axis. In the latter case, the continuous mixing of the charge undergoing treatment is improved.

The carding action previously described may be performed on the coagulated molded sponges while the latter are in the dry or wet state.

Another procedure for removing or opening up the crust of the molded product consists in subjecting the molded coagulated material to the action of a flame, whereby the material is singed. The singeing is preferably employed with wet or moist sponges in order to prevent the substances undergoing treatment from being ignited. Singeing causes wearing down of a very thin superficial layer which disappears automatically during the subsequent manipulations of the artificial sponges. Blackening of the sponges is negligible if the flame employed in the singeing operation is properly adjusted. The singeing is continued for a period of time sufficient to produce the desired highly porous surface.

If desired, the crust surface may be opened up or rendered highly porous by the conjoint use of the carding and singeing operations herein set forth, it being immaterial which operation is performed first.

In order to more clearly explain this invention, reference will be had to the accompanying drawing forming a part of this specification and wherein:

Figure 1 is a front elevation of one form of an apparatus employed in the singeing process;

Figure 2 is a side elevation, partly in section, of the apparatus shown in Figure 1; and Figure 3 is a vertical section of a modified form of apparatus employed in the singeing operation.

Referring now to the drawing, wherein like reference numerals designate like parts, and particularly to Figures 1 and 2, the reference numeral 1 designates a plate revolvably mounted by means of an axle 2 on a support 3. The plate is provided with two series of alternate sockets $a$ and $b$ pressed out in opposite directions and constituting sponge-carrying means. In front of each socket and adjacent one side of plate 1, burners 4 (Figure 2) are arranged. In operation, the sockets of the face opposite the burners are provided with balls of sponges, as at A, by simple partial insertion, the sponges being held in position by the pressure of the wall of the socket on the sponge. The plate 1 is then revolved 180° about the axis of the shaft, and one or several of the burners 4, fed by gas, gasoline, etc., are lighted. The burners 4 are of a type in which the flames thereof extend over the exposed parts of the balls. While the sponges, say in sockets $b$, are being exposed to the flames, sockets $a$ are being supplied with sponges from the opposite side of the plate. After the balls have been subjected to the flames for the necessary time, the flames are lowered and the shaft is turned again. The singeing operation now is performed on the sponges inserted in sockets $a$, and the previously partially singed sponges in sockets $b$ are carefully inspected and reversed in the sockets so that the portions thereof not previously in contact with the flames may be subjected to the action of the flames. The apparatus is turned, and the operation is continued by replacing the singed sponges by others that are to be treated.

One or several rows of burners may be used. If desired, a single burner or several movable burners may be employed. Control members connected to the shaft may be provided for decreasing and increasing the fuel feed. Automatic regulators may also be employed for the control and limitation of the singeing intensity and for controlling the duration of each operation.

In the embodiment shown in Figure 3, the device is provided with a base 5 having a central boss 6 through which passes a vertical shaft 7. A gear 8 driven by a motor (not shown) is secured to one end of the shaft 7, and a light metal disc 9 is secured to a boss 7' carried by the opposite end of the shaft and resting on an end bearing 10. The rim or marginal surface of the disc 9 is provided with bearings 11 in which are mounted radial spindles 12. Each spindle 12 tapers off to a point at the outer end, and at the opposite end carries a pinion 13 meshing with a toothed rack 14 carried by the base 5. Below the plane of the spindles, a row of burners 15 is arranged to extend in a sector of suitable extent. It is to be noted that the burners 15 direct the flames thereof upward and are of a design to permit the flames to contact with the rounded surface of the sponges.

In operation, a ball A to be treated is stuck on each spindle. By means of the gear 8 the motor imparts gyratory motion to the disc 9. This movement causes the pinions 13 rolling on the toothed rack 14 to rotate the spindles. In consequence of this movement, all the balls are led in turn over the row of burners 15 and are singed while being rotated. The entire surface of the sponges is thus exposed to the action of the flames. The operation is continuous, the sponges being arranged on the spindles in the sector not provided with burners and then taken off after having been singed. In order to obtain still more uniform results, oscillating and reciprocating motions may be given to the row of burners. The burners may also be disposed in several sectors separated by sectors not provided with burners. If desired, the spindles 12 may be rotated only during the period the sponges carried thereby are contacted by the flames.

The appropriately adjusted singeing of artificial viscose sponges in the moist or wet state enables one to destroy rapidly the superficial crusty and not very permeable layer. The sponge balls adopt at the same time a better appearance and after treatment present a velvety porous surface of agreeable aspect.

Though the process of the invention has been especially described for artificial sponges in the form of balls, it is not restricted to the latter but may also be applied to other forms, such as blocks, etc., by some suitable modifications of the device.

Since it is obvious that various changes and modifications may be made in the above description without departing from the nature or spirit thereof, this invention is not restricted thereto except as set forth in the appended claims.

I claim:

1. A method of producing a porous-surfaced artificial sponge which comprises carding and singeing the crust surfaces of a molded coagulated sponge-forming composition.

2. A method of producing a porous-surfaced artificial sponge which comprises singeing the crust surfaces of a molded coagulated sponge-forming composition.

3. A method of producing a porous-surfaced artificial sponge which comprises singeing the crust surfaces of a molded coagulated sponge-forming composition while said surfaces are in the moist state.

LÉON PIERRE GEORGES VAUTIER.